United States Patent [19]

Strong et al.

[11] 4,182,441
[45] Jan. 8, 1980

[54] PIPE SNUBBER INCLUDING RESERVOIR AND SEAL STRUCTURE

[76] Inventors: Grant H. Strong, 1407 Sunset, Richland, Wash. 99352; Donald J. Lagrou, Rte. 1, Box 372, Shelton, Wash. 98584

[21] Appl. No.: 777,240

[22] Filed: Mar. 11, 1977

[51] Int. Cl.$^2$ .................................... F16F 9/20
[52] U.S. Cl. .................................... 188/312; 74/18.2; 188/268; 188/314; 188/322
[58] Field of Search ............... 188/268, 312, 314, 316, 188/317, 322; 74/18.2

[56] References Cited

U.S. PATENT DOCUMENTS

| | | | |
|---|---|---|---|
| 2,314,404 | 3/1943 | Katcher | 188/322 X |
| 2,713,401 | 7/1955 | Serste et al. | 188/316 X |
| 3,151,856 | 10/1964 | Bresk et al. | 188/317 A |
| 3,666,256 | 5/1972 | Ellis et al. | 188/322 X |

FOREIGN PATENT DOCUMENTS

| | | | |
|---|---|---|---|
| 923592 | 2/1955 | Fed. Rep. of Germany | 188/314 |
| 1144544 | 2/1963 | Fed. Rep. of Germany | 188/322 |
| 486689 | 11/1953 | Italy | 188/316 |
| 1304918 | 1/1973 | United Kingdom | 188/312 |
| 1339762 | 12/1973 | United Kingdom | 188/312 |

OTHER PUBLICATIONS

Spooner, L. W., Silicone Putty as an Engineering Material, Product Engineering, Jan. 1950, pp. 90–93.

*Primary Examiner*—George E. A. Halvosa
*Attorney, Agent, or Firm*—J. Winslow Young; H. Ross Workman; Rick D. Nydegger

[57] ABSTRACT

A pipe hanger/snubber for supporting and/or protecting high-pressure piping and the like against damage by seismic, vibrational, and thermal shocks to the mechanical integrity of the piping system. The apparatus includes a sealed snubber cylinder containing a non-Newtonian fluid as the hydraulic fluid medium. A working shaft extends completely through the snubber cylinder. A shaft-mounted, perforate load nozzle is moved longitudinally through the non-Newtonian fluid in the snubber cylinder to thereby dissipate the shock forces. Shaft-engaging seals at each end of the snubber cylinder inhibit leakage of the non-Newtonian fluid from the snubber cylinder. Selectively, reservoir apparatus containing non-Newtonian fluid are provided adjacent at least one seal to compensate for leakage, if any, of the non-Newtonian fluid through the seal. The reservoir apparatus are provided with leakproof closures and, selectively, compression/expansion apparatus to compensate for volume changes imposed on the non-Newtonian fluid in the reservoir apparatus.

7 Claims, 3 Drawing Figures

U.S. Patent  Jan. 8, 1980  4,182,441
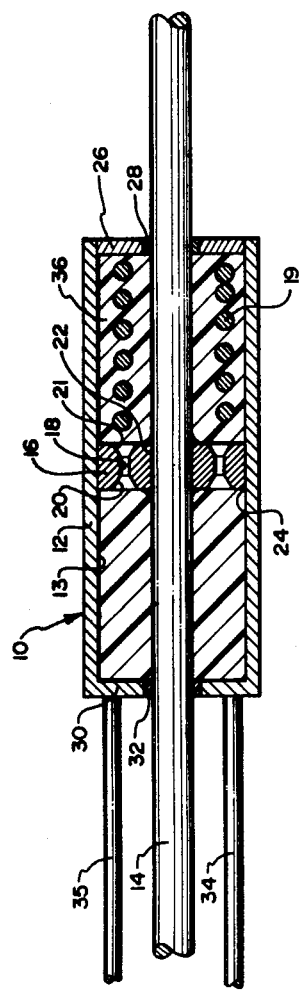
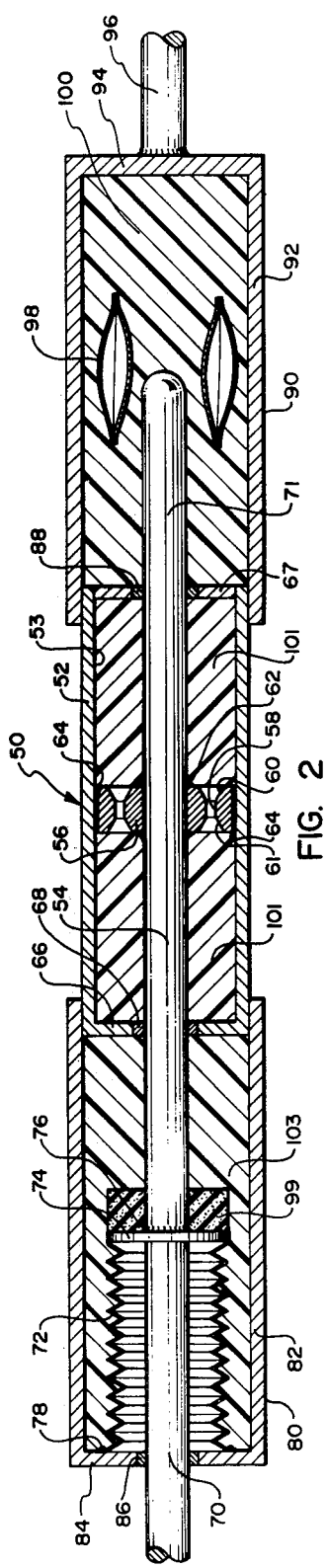
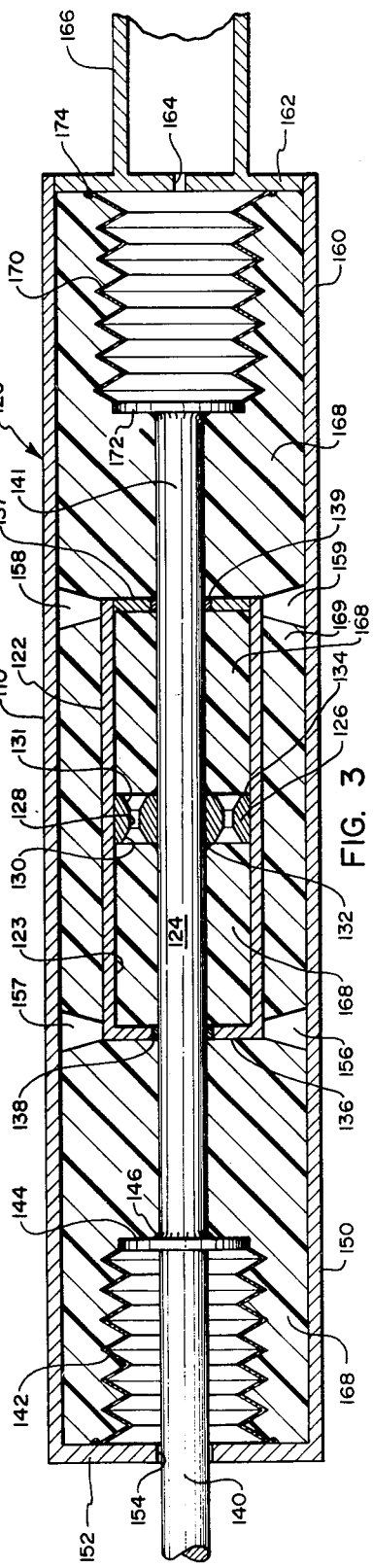

PIPE SNUBBER INCLUDING RESERVOIR AND SEAL STRUCTURE

BACKGROUND

1. Field of the Invention

The present invention relates to a support/shock-absorbing apparatus for securement of structures susceptible to damage by relative movement or vibration. More particularly, the present invention is concerned with improvements in pipe snubbers incorporating a non-Newtonian fluid as the hydraulic fluid.

2. The Prior Art

Historically, developments in chemical processing equipment and steam-powered, electrical generating systems and, more recently, systems utilizing nuclear energy as the prime energy source have led to increased emphasis on equipment safety and protection. In particular, it is extremely important that high-pressure, high-temperature conduits and/or critical cooling fluid systems for nuclear power systems be adequately protected. These conduits must be protected from rupture through (a) normal operating conditions such as vibration and dimensional changes caused by temperature fluctuations of the fluid streams, and (b) catastrophic events such as seismic shock and the like. For example, a safely operating nuclear power system demands an uninterrupted flow of coolant to the reactor core. Coolant failure could cause the reactor core to melt resulting in a catastrophic breachment of the fuel containment means with a resultant release of radioactive debris to the environment.

Accordingly, it has become conventional practice to attach shock-absorbing apparatus, commonly referred to as pipe snubbers, to the particular piping system so as to dampen or otherwise dissipate the energy which would tend to destroy the structural integrity of the piping. In light of the critical nature of the operational reliability of these pipe-snubbing apparatus, the responsible regulatory commissions currently impose extremely stringent operational and safety requirements on pipe.

Historically, pipe snubbers have included both mechanical pipe snubbers and hydraulic pipe snubbers. Mechanical pipe snubbers are usually extremely complex.

Hydraulic pipe snubbers overcome many of the problems inherent in mechanical pipe snubbers but are notorious for their tendency to develop leaks of the hydraulic fluid. Leaks develop in hydraulic pipe snubbers because they are frequently used in hostile environments such as under high temperatures or in areas of high radiation dosages. Under these conditions, a conventional elastomeric seal material, such as rubber, hardens and loses its sealing effectiveness. Leakage of a sufficient quantity of hydraulic fluid will render the hydraulic pipe snubber inoperative as a shock-absorbing device. Accordingly, it has become a conventional practice to assume that leakage of any hydraulic fluid from a hydraulic pipe snubber is an indication of complete failure of the hydraulic pipe snubber thereby requiring its replacement. Frequent replacement of pipe snubbers in a nuclear power plant is a very costly, time-consuming procedure.

The general configuration of most conventional hydraulic pipe snubbers also dictates that it be oriented in a near-vertical working orientation to minimize the foregoing leakage problems. Horizontal applications are, therefore, generally precluded for conventional hydraulic pipe snubbers.

Although the hydraulic pipe snubber avoids certain of the limitations inherent in mechanical pipe snubbers, they are not used as support members unless some form of mechanical support mechanism is incorporated. For example, a shear pin, spring or the like imparts the necessary mechanical support characteristics to the hydraulic pipe snubber.

Additionally, conventional hydraulic pipe snubbers have a tendency to operate in a nearly generally linear fashion; that is, the greater the force imposed upon the hydraulic pipe snubber, the greater the degree of movement permitted by the hydraulic pipe snubber until stopped or snubbed by a rate controlled valve or the like. This has the advantage of accommodating gradual changes in relative pipe position caused by gradual thermal changes and the like.

It would, therefore, be an advancement in the art to provide a pipe snubber which, advantageously, reacts in a near-linear fashion in response to gradual movement of a structural member while reacting in a non-linear fashion under forces rapidly imposed upon the structural member. It would be an even further advancement in the art to provide a pipe snubber utilizing a non-Newtonian material as the hydraulic fluid medium. It would be an even still further advancement in the art to provide a pipe snubber which substantially eliminates the problem of leakage from the snubber cylinder while readily accommodating replacement of leaked fluid.

BRIEF SUMMARY AND OBJECTS OF THE INVENTION

The present invention relates to a pipe hanger/snubber which utilizes a snubber cylinder filled with a non-Newtonian fluid as the hydraulic fluid. At lower force levels, a perforate load nozzle is forced through the non-Newtonian fluid thereby dissipating some of the external disruptive forces imposed upon the pipe snubber. The non-Newtonian fluid thereby readily accommodates gradual changes in the piping structure in a near-linear fashion. The non-Newtonian fluid imparts a non-linear reaction characteristics to the pipe snubber when the pipe snubber is subjected to strong, rapidly moving forces. Thus, the pipe snubber permits slow relative movement between two objects with little restriction of movement but acts in a relatively rigid manner to effectively lock the two objects together when one tries to move with excessive rapidity relative to the other. is The non-Newtonian fluid provides the further advantage in that it is less prone to leak from the pipe snubber due to its inherent thixotropic properties and viscosity. Advantageously, reservoir means can be included in the pipe snubber apparatus to compensate for any leakage of the non-Newtonian fluid from the snubber cylinder thereby effectively reducing leakage on an integrated time basis.

It is, therefore, a primary object of this invention to provide improvements in pipe snubbers.

Another object of this invention is to provide improvements in the method of snubbing a pipe.

Another object of this invention is to provide a pipe snubber having a non-Newtonian fluid as the hydraulic fluid medium.

Another object of this invention is to provide a pipe snubber having a shaft which extends completely through the snubber cylinder thereby minimizing volume changes of the hydraulic fluid in the cylinder.

Another object of this invention is to provide a fluid reservoir means at each position where the shaft extends from the cylinder to compensate for leakage of fluid from the cylinder and to permit any leakage to flow back into the cylinder.

Another object of this invention is to provide an improved method for compensating for leakage of hydraulic fluid from a hydraulic shock absorber apparatus.

These and other objects and features of the present invention will become more fully apparent from the following description and appended claims taken in conjunction with the accompanying drawing.

BRIEF DESCRIPTION OF THE DRAWING

FIG. 1 is a partial cross section of a first preferred pipe snubber embodiment;

FIG. 2 is a partial cross section of a second preferred pipe snubber embodiment; and FIG. 3 is a partial cross section of a third preferred pipe snubber embodiment.

DETAILED DESCRIPTION OF THE PREFERRED EMBODIMENTS

The invention is best understood by reference to the figures wherein like parts are designated with like numerals throughout.

GENERAL DISCUSSION

The pipe snubber of the present invention advantageously utilizes a non-Newtonian fluid as the hydraulic working fluid. A non-Newtonian fluid is defined herein as a fluid which does not conform to Newton's Law. Newton's Law states that an increase in pressure or rate of shear increases the velocity (and therefore the rate at which the fluid passes through a tube) in the same proportion. In the present invention, the non-Newtonian fluid exhibits a high resistance to flow under high shear forces while, correspondingly, exhibiting near-linear, lower resistance to flow under low shear forces. A commercially available non-Newtonian fluid currently believed to be advantageously usable in the present invention is a silicone elastomer known in the trade as "silicone putty." This one suitable type of silicon elastomer is manufactured and sold by General Electric Co., Silicone Products Department, Waterford, New York, under their trade designation of G. E. SS91 Silicone Bouncing Putty. This silicone elastomer is also believed to be the subject of U.S. Pat. No. 2,541,851.

Another hydraulic elastomer is disclosed in U.S. Pat. No. 3,843,601. However, this hydraulic elastomer functions in an apparent reverse relationship to the desired characteristics of the present invention; that is, the hydraulic elastomer of this latter patent is easily deformed under pressure and breaks down into soft particles under high shear, the particles having the property of flowing under pressure but not under the influence of gravity alone. This is apparently contrary to the present invention which utilizes a hydraulic elastomer which provides a strong initial resistance to flow under high shear stresses while readily flowing under relatively gradual stresses.

The silicone elastomer, useful in the present invention, has the advantage in that it readily deforms and flows under low energy forces without significant degradation of the silicone elastomer. Additionally, even when low pressures are applied, the rate of flow is not proportional to the force imposed. Thus, the silicone elastomer acts as a non-Newtonian, thixotropic liquid (rate of flow increases only slightly with shearing stress above a threshold value).

At higher pressures, the silicone elastomer acts approximately as a plastic solid. Therefore, when pressures are applied suddenly, the silicone elastomer becomes dilatant which means that the material becomes hard and brittle and the rate of flow increases less than proportionally with the pressure applied.

Additional tests have been conducted which indicate, for example, that the silicone elastomeric material useful in this invention can be used in environments of about 200° C. and a radiation exposure level exceeding $2 \times 10^8$ Roentgens without significant degradation of the desirable non-Newtonian, hydraulic characteristics of the material.

THE EMBODIMENT OF FIG. 1

Referring now more particularly to FIG. 1, a first preferred embodiment of the pipe snubber apparatus of this invention is shown generally at 10. Pipe snubber 10 includes a snubber cylinder 12 and a longitudinally movable shaft 14 cooperating in snubber cylinder 12. Snubber cylinder 12 is configurated as a closed cylinder with the exception of where shaft 14 extends through seals 32 and 28 in each of end closures 30 and 26, respectively. End closure 26 is configurated as a removable end to accommodate fabrication, filling and assembly of pipe snubber 10. Snubber cylinder 12 is filled with an elastomeric material 36 which is specifically chosen as a suitable non-Newtonian fluid to impart the desired non-linear operational features to pipe snubber 10.

A piston or, more particularly, a load nozzle 16 is secured to shaft 14 at 22. Load nozzle 16 is slideable along the internal surface 13 of snubber cylinder 12 and thereby acts as a bearing surface for the combination of shaft 14 and load nozzle 16. Advantageously, the tolerance between load nozzle 16 and internal surface 13 as indicated at bearing surface 24 is not critical with respect to the dimensional tolerances involved since a slight leakage adjacent bearing surface 24 is of little consequence. This is particularly relevant since a plurality of flow orifices 18 are also provided through load nozzle 16.

Flow orifices 18 are provided as flow passages for elastomeric material 36 from one side of load nozzle 16 to the other as a result of relative longitudinal movement of shaft 14. Each of flow orifices 18 are provided with conical inlet/outlets 20 and 21. The conical shape of inlet/outlets 20 and 21 is believed necessary to accommodate flow of elastomeric material 36 therethrough since it is currently understood that elastomeric material 36 will flow around a sharp corner only with relatively great difficulty.

Pipe snubber 10 is adapted for placement between a fixed object (not shown) and a movable structure (not shown) such as a pipe system and the like. Shaft 14 is secured to one object while snubber cylinder 12 is secured to the other object by means of connecting rods 34 and 35. Commercially available pipe support system attachment hardware, such as conventional clevis equipment, turnbuckles, eye screws, threaded rods and the like, are used for installation of pipe snubber 10 between the two objects. Slow, low energy induced relative movement between the two objects is damped by the damping action imparted by resistance to movement of load nozzle 16 through elastomeric material 36.

Since conventional hydraulic pipe snubbers generally do not lend themselves well as separate, static support apparatus for piping systems (not shown), a conventional spring 19 may be embedded in the elastomeric material 36 on at least one side of load nozzle 16. In this configuration, the inherent compression characteristics of spring 19 serve as a mechanical support mechanism. Pipe snubber 10 is suspended at the right end of shaft 14 from an overhead, fixed support (not shown). A piping system (not shown) is suspended from connecting rods 34 and 35. Under such conditions, spring 19 is specifically configured to support the weight of the particular piping system without interferring with the snubbing action of pipe snubber 10. In this manner, pipe snubber 10 and, more particularly, the cooperation between load nozzle 16 and elastomeric material 36 provides the desired non-linear reaction of pipe snubber 10 to forces tending to disrupt the piping system as set forth hereinbefore.

THE EMBODIMENT OF FIG. 2

Referring now more particularly to FIG. 2, a second preferred embodiment of the pipe snubber of this invention is shown herein generally at 50. Pipe snubber 50 includes a snubber cylinder 52 which cooperates with a load nozzle 56 secured to a shaft 54 at weld 62. External forces acting on pipe snubber 50 move shaft 54 axially relative to snubber cylinder 52 and force load nozzle 56 through the hydraulic medium, silicone elastomer 101. Load nozzle 56 includes a plurality of flow orifices 58 drilled therethrough and through which the hydraulic elastomer 101 is forced. The forcing of hydraulic elastomer 101 around and through load nozzle 56 dissipates the lower energy levels imparted to pipe snubber 50 by relatively slow, gradual relative movement between the piping (not shown) and the fixed object (not shown).

The inlet to and outlet from flow orifice 58 are also formed as conical inlet/outlet surfaces 60 and 61. It should be particularly noted that load nozzle 56 is spaced an incremental distance, space 64, from the internal surface 53 of snubber cylinder 52. Space 64 permits the passage of a limited amount of hydraulic elastomer 101 adjacent load nozzle 56 when the same is gradually forced through the hydraulic elastomer 101. Alternatively, space 64 can be substantially eliminated so that load nozzle 56 provides additional bearing surfaces for shaft 54. However, space 64 also assures alignment for a 3-point bearing surface configuration for shaft 54 to produce better operation and operational longevity for pipe snubber 50.

It should also be particularly noted that this second preferred embodiment, pipe snubber 50, does not include a spring member 19 (FIG. 1). However, clearly, pipe snubber 50 could include a spring member such as spring member 19 (FIG. 1) on either the right or the left side of load nozzle 56 and thereby function as a pipe support/pipe snubber as in the first preferred embodiment, pipe snubber 10 (FIG. 1).

Snubber cylinder 52 is closed at each end by end closures 66 and 67. Shaft 54 passes through seals 68 and 88 in end closures 66 and 67, respectively. Seals 68 and 88 minimize leakage of hydraulic elastomer 101 from snubber cylinder 52 and also serve as bearing surfaces for shaft 54.

A reservoir 90 is attached to the snubber cylinder 52 at end closure 67 so as to enclose seal 88 in a body of hydraulic elastomer 100. Reservoir 90 is formed with a cylinder 92 having an end closure 94 to which an anchor 96 is secured. Reservoir 90 thereby functions as (1) a reservoir means for compensating for leakage of hydraulic elastomer through seal 88 and (2) an anchor means for anchoring the snubber cylinder 52 portion of pipe snubber 50.

Shaft 54 extends through seal 88 into reservoir 90 as a terminal end 71. Since shaft 54 extends completely through snubber cylinder 52, there is no volumetric change in hydraulic elastomer 101 which must be accounted for during the axial movement of shaft 54. However, axial movement of terminal end 71 alters the volumetric displacement of hydraulic elastomer 100 in reservoir 90. Accordingly, a plurality of compression pockets 98 are disposed in the hydraulic elastomer 100 and are compressible/expansible so as to compensate for volumetric changes imposed by the axial movement of terminal end 71. Compression pockets 98 are configurated as sealed envelopes which contain a compressible/expansible gas therein and are of sufficient combined volumetric capacity to compensate for axial movement of terminal end 71 between end closure 67 and end closure 94.

It should be particularly noted that terminating shaft 54 in a terminal end 71 in reservoir 90 eliminates the need for a second seal means that would otherwise be required if shaft 54 extended completely through reservoir 90.

The opposite end of shaft 54, end 70, is enclosed by and passes completely through a second reservoir 80. Reservoir 80 is formed by a reservoir cylinder 82 and an end closure 84 so as to contain a body of hydraulic elastomer 103 and thereby envelope seal 68 therein. In light of the rather stringent operational tolerances imposed upon pipe snubbers particularly with respect to leakage, reservoir 80 is specifically configured to be substantially leakproof by means of an expansible bellows member 72.

Bellows member 72 is configurated as a convoluted, impervious, flexible tubular member which is sealed along one periphery at 78 to end closure 84. Bellows member 72 is securely attached at its other end along its periphery to a circular bellows plate 74 welded to shaft 70 at weld 76. The convolutions in bellows member 72 permit it to expand and contract longitudinally upon axial movement of shaft 70.

Since bellows member 72 is configurated as a flexible, impervious member to thereby provide a hollow anulus around shaft end 70, lateral constriction and expansion of bellows member 72 substantially compensates for relative volumetric changes imposed on hydraulic elastomer 103 by the longitudinal contraction and expansion of bellows member 72. Additional volumetric compensation is provided by a compression member 99 embedded in hydraulic elastomer 103.

Compression member 99 is fabricated from a closed-cellular, sponge-like material which has a high degree of compressibility. Accordingly, compression member 99 functions substantially similarly to compression pocket 98 as a means for providing the desired degree of compressibility to compensate for changes in the volumetric ratio imposed on the hydraulic elastomer 103 in reservoir 80.

Shaft end 70 extends through a seal 86 in end closure 84 with seal 86 serving as a bearing point for shaft end 70. Seal 86 also serves as one final barrier against leakage of hydraulic elastomer 103 from reservoir 80 in the event a leak inadvertently develops in bellows member 72.

THE EMBODIMENT OF FIG. 3

Referring now more particularly to FIG. 3, a third preferred pipe snubber embodiment is shown herein generally at 120 and includes a snubber cylinder 122. Snubber cylinder 122 is anchored inside a reservoir cylinder 110 which serves as the main housing for pipe snubber 120. Snubber cylinder 122 is anchored by a plurality of spaced anchor elements 156-159 which provide a secure engagement between reservoir cylinder 110 and snubber cylinder 122.

Snubber cylinder 122 is configured substantially similarly to snubber cylinder 52 (FIG. 2) and snubber cylinder 12 (FIG. 1). In particular, snubber cylinder 122 includes a shaft 124 extending therethrough to which is securely welded at weld 132 a load nozzle 126. Shaft 124 extends through seals 138 and 139 which function (1) to retain a hydraulic elastomer 168 inside snubber cylinder 122 and (2) as bearing surfaces for shaft 124.

Load nozzle 126 includes a plurality of flow orifices 128 with inlet/outlet conical surfaces 130 and 131. Load nozzle 126 slidingly cooperates with an inside surface 123 of snubber cylinder 122 and thereby acts as another bearing surface for load nozzle 126 or, more particularly, shaft 124. In the particular illustrated embodiment of FIG. 3, the bearing surface 134 between load nozzle 126 and inside surface 123 is provided with a relatively close tolerance thereby forcing substantially all of hydraulic elastomer 168 through flow orifices 128.

Shaft 124 terminates at its right end in a terminal end 141 and extends to an extension end 140 at its left end. Terminal end 141 terminates in a bellows plate 172 to which is securely mounted one end of a bellows member 170. Bellows member 170 is configurated substantially similar to bellows member 72 (FIG. 2). Bellows member 170 is secured to end closure 162 of reservoir cylinder 110 along an annular weld 174 to thereby provide an impervious seal against leakage of hydraulic elastomer 168 from reservoir cylinder 110. Bellows member 142 also provides an impervious seal by being secured between end closure 152 and a bellows plate 144 which is welded to shaft 124 at weld 146.

End closure 162 includes a port 164 whch provides fluid communication between the interior of bellows member 170 and the exterior of reservoir cylinder 110. In this manner, means are provided for equalizing pressures between inside bellows member 170 and the ambient as a result of axial movement of shaft 124. In the particular embodiment illustrated in FIG. 3, port 154 is also configurated as an enlarged port so as to provide fluid communication with the interior of a bellows member 142 for pressure equalization when bellows member 142 is flexed.

End closure 162 has secured thereto a tubular anchor member 166 which serves as an anchoring device for anchoring reservoir cylinder 110 to a first object. The opposite end of pipe snubber 120 is anchored by shaft extension 140. Shaft extension 140 extends from reservoir cylinder 110 through a port 154 for anchoring the shaft 124 to a second object (not shown).

It should be particularly noted with respect to this third preferred embodiment that it is particularly characterized by the absence of compression devices such as the compression pockets 98 and compression member 99 of FIG. 2. The absence of compression devices is accommodated by providing fluid communication between the left-hand reservoir section 150 and the right-hand reservoir section 160 through the annular space around snubber cylinder 122 and represented herein as annular space 169. Accordingly, a volumetric change initiated by axial movement of shaft 124 will be communicated through the hydraulic elastomer 168 in annular space 169 between the two ends thereby readily compensating for any changes in the volumetric ratios of the respective reservoir sections 150 and 160. Clearly, if desired, compression devices could also be placed within reservoir cylinder 110 and thereby serve a similar function as the compression member 99 and compression pockets 98 of FIG. 2. However, it is currently believed to be unnecessary to incorporate such compression devices in the pipe snubber embodiment illustrated in FIG. 3.

This third pipe snubber embodiment 120 can also be configurated as a pipe support member by incorporating a spring, such as spring 19 (FIG. 1), to serve as a static load-bearing member. Pipe snubber 120 and, more particularly, spring 19 (FIG. 1) would thereby support the static load imparted by the piping system (not shown).

Additionally, the various features illustrated in any one of the pipe snubber embodiments of FIGS. 1, 2 and 3 may be readily interchanged with the particular corresponding features found in a corresponding pipe snubber development, as desired. Importantly, in each embodiment, the respective snubber cylinders are configurated as closed cylinders which enclose a constant volume body of hydraulic elastomer through which the respective load nozzle is moved. Movement of the load nozzle through the hydraulic elastomer dissipates the lower energy, slower moving forces imposed on the respective pipe snubber. To this end, core is taken to assure that no air pockets or compression devices are inadvertently placed inside the respective snubber cylinders since such compression devices would possibly impair the desired non-linear functional features of the particular pipe snubber embodiment. In particular, a compression device would cause a deterioration of the desired non-linear function of the particular pipe snubber embodiment since a compression device would be readily compressible and thereby allow relatively unrestricted movement of the particular load nozzle relative to the respective snubber cylinder. Such an unrestricted relative movement would render the particular pipe snubber embodiment substantially inoperative with respect to its desired characteristics.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by a United States Letters Patent is:

1. A snubber comprising:

a snubber cylinder having a length, an inside diameter, a first end and a second end, the first end having a first closure with a first aperture, the second end having a second closure with a second aperture;

a shaft having a diameter less than the inside diameter of the cylinder and a length greater than the length of the cylinder, the shaft being mounted in the cylinder and extending a first end through the first aperture and a second end through the second aperture;

a load nozzle secured to the shaft and having a diameter which is less than the inside diameter of the cylinder, the load nozzle having a length substantially less than the length of the cylinder so as to accommodate reciprocating movement along the length of the cylinder, the load nozzle comprising a piston having a plurality of apertures therethrough;

a hydraulic fluid medium in the cylinder, the fluid adapted to resist movement of the load nozzle by resisting flow through the load nozzle apertures;

a first seal means in the first closure aperture and a second seal means in the second closure aperture, the first and second seal means resisting leakage of the fluid around the shaft while permitting reciprocating movement of the shaft with the cylinder;

a first reservoir enclosing the first seal means, the shaft passing through the first reservoir and a third seal means to seal the shaft against leakage from the first reservoir, the third seal means comprising a flexible bellows fixedly mounted at one end to the shaft inside the first reservoir;

a first compression means in the first reservoir;

a second reservoir enclosing the second seal means, the shaft terminating inside the second reservoir; and a second compression means in the second reservoir.

2. The snubber defined in claim 1 wherein the hydraulic fluid medium comprises a non-Newtonian fluid.

3. The snubber defined in claim 1 wherein the first compression means comprises a sponge-like material compression member.

4. The snubber defined in claim 1 wherein the second compression means comprises a pocket of compressible fluid.

5. The snubber defined in claim 4 wherein the pocket comprises a sealed envelope.

6. A snubber comprising:

a cylinder having a length, an inside diameter, a first end with a first closure at the first end and a second end with a second closure at the second end, the first closure having a first concentric aperture, the second closure having a second concentric aperture;

a shaft having a diameter less than the inside diameter of the cylinder and a length greater than the length of the cylinder, the shaft being adapted to reside coaxially in the cylinder and passing a first end through the first aperture and a second end through the second aperture;

a load nozzle secured to the shaft and having a diameter less than the inside diameter of the cylinder, the load nozzle having a length which is an incremental portion of the cylinder length, the load nozzle having a plurality of apertures;

a first seal means in the first concentric aperture and a second seal means in the second concentric aperture for sealing the cylinder;

a non-Newtonian fluid in the cylinder;

a first reservoir means containing non-Newtonian fluid and enclosing the first seal means, the shaft extending through the first reservoir means;

a flexible bellows inside the first reservoir means, the bellows encircling a portion of the shaft and fixedly mounted at one end to the shaft and at the other end to the first reservoir;

a second reservoir means containing non-Newtonian fluid and enclosing the second seal means, the shaft terminating inside the second reservoir means; and a compression means inside the second reservoir means, the compression means providing compensation for volumetric changes in the second reservoir means upon reciprocatory movement of the end of the shaft in the second reservoir means.

7. A method for snubbing a movable object comprising the steps of:

obtaining a cylinder having a length and an inside diameter;

forming a shaft having a diameter less than the inside diameter of the cylinder and a length greater than the length of the cylinder;

securing a load nozzle to the shaft, the load nozzle having a diameter less than the inside diameter of the cylinder and a length an incremental portion of the length of the cylinder, the load nozzle including a plurality of apertures;

mounting the shaft coaxially in the cylinder with the load nozzle residing in the cylinder and adapted to be reciprocatingly moved along the length of the cylinder;

slideably sealing each end of the shaft extending from the cylinder, a first end of the shaft being slideably sealed by a first seal and a second end of the shaft being slideably sealed by a second seal;

filling the cylinder with a non-Newtonian fluid;

attaching the first end of the shaft to the movable object;

attaching the cylinder to a second object thereby snubbing the first object by damping movement of the shaft and load nozzle relative to the cylinder by resisting movement of the non-Newtonian fluid through the apertures in the load nozzle;

compensating for leakage of non-Newtonian fluid from the cylinder through the first seal by enclosing the first seal in a first reservoir filled with non-Newtonian fluid, the first end of the shaft extending through the first reservoir;

inhibiting leakage from the first reservoir by enclosing a portion of the first end of the shaft inside the first reservoir with a bellows member, the bellows member cooperating between the shaft and the first reservoir, the bellows member permitting reciprocatory movement of the shaft while inhibiting leakage of non-Newtonian fluid from the first reservoir;

enclosing the second end of the shaft and the second seal in a second reservoir filled with non-Newtonian fluid; and placing compression means in the second reservoir thereby providing compensatory volume changes for volume changes caused by reciprocatory movement of the second end of the shaft in the non-Newtonian fluid in the second reservoir.

* * * * *